United States Patent
Barham et al.

(10) Patent No.: US 10,203,974 B2
(45) Date of Patent: Feb. 12, 2019

(54) PROBE INSERTION VIA BACKGROUND VIRTUAL MACHINE

(75) Inventors: Paul Barham, San Francisco, CA (US); Joseph N. Figueroa, Kirkland, WA (US); Jeremiah C. Spradlin, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 919 days.

(21) Appl. No.: 12/972,531

(22) Filed: Dec. 20, 2010

(65) Prior Publication Data

US 2012/0159454 A1 Jun. 21, 2012

(51) Int. Cl.
*G06F 9/50* (2006.01)
*G06F 11/34* (2006.01)
(Continued)

(52) U.S. Cl.
CPC ........ *G06F 9/45558* (2013.01); *G06F 11/301* (2013.01); *G06F 11/3096* (2013.01);
(Continued)

(58) Field of Classification Search
CPC .. H04L 43/08; G06F 9/45533; G06F 11/3433; G06F 11/3495; G06F 9/5077; G06F 21/53
(Continued)

(56) References Cited

U.S. PATENT DOCUMENTS 6,263,491 B1 7/2001 Hunt
6,598,012 B1 7/2003 Berry et al.
(Continued)

FOREIGN PATENT DOCUMENTS

CN 101021800 A 8/2007
CN 101719081 A 6/2010
(Continued)

OTHER PUBLICATIONS

Dewan, Prashant, et al. "A hypervisor-based system for protecting software runtime memory and persistent storage." 2008. Proceedings of the 2008 Spring simulation multiconference. Society for Computer Simulation International.*
(Continued)

*Primary Examiner* — Lewis A Bullock, Jr.
*Assistant Examiner* — Gilles R Kepnang
(74) *Attorney, Agent, or Firm* — Alleman Hall Creasman & Tuttle LLP (57) ABSTRACT

A performance monitoring system is described herein that works with a hypervisor to reserve resources outside of a virtual machine to monitor performance of an application running within the virtual machine. The application receives the guaranteed amount of resources specified by the virtual machine's specifications, and the monitoring system consumes resources not associated with the virtual machine. The application running in the virtual machine is already isolated by the hypervisor from the physical machine, and thus additional burdens on the physical machine that allow the hypervisor to continue meeting guarantees to the virtual machine will not impact application performance. The performance monitoring system provides instrumentation of deployed applications that information technology (IT) personnel can dynamically turn on and off without affecting the performance of the deployed application. The performance monitoring system provides a robust framework for monitoring production applications without affecting the performance of those applications during execution.

15 Claims, 3 Drawing Sheets

(51) Int. Cl.
  *G06F 9/455* (2018.01)
  *G06F 11/30* (2006.01)
  *G06F 11/36* (2006.01)
  G06F 21/53 (2013.01)
  G06F 21/57 (2013.01)

(52) U.S. Cl.
  CPC ...... *G06F 11/3466* (2013.01); *G06F 11/3644* (2013.01); *G06F 9/45533* (2013.01); *G06F 9/5077* (2013.01); *G06F 2009/45591* (2013.01); *G06F 2201/815* (2013.01); *G06F 2221/2141* (2013.01)

(58) Field of Classification Search
  USPC .............. 707/1; 714/57; 717/126, 128, 158; 718/1
  See application file for complete search history.

(56) References Cited

U.S. PATENT DOCUMENTS

| | | | |
|---|---|---|---|
| 6,647,432 B1* | 11/2003 | Ahmed | G06F 3/041 709/202 |
| 6,760,903 B1* | 7/2004 | Morshed | G06F 11/3466 717/130 |
| 7,506,317 B2* | 3/2009 | Liang et al. | 717/130 |
| 7,568,185 B1* | 7/2009 | Shapiro | G06F 11/3466 717/130 |
| 7,574,709 B2 | 8/2009 | Erlingsson et al. | |
| 7,590,521 B2 | 9/2009 | Ma et al. | |
| 7,661,095 B2 | 2/2010 | George | |
| 7,689,558 B2 | 3/2010 | Rossmann | |
| 7,810,075 B2* | 10/2010 | Dostert | G06F 11/3476 717/124 |
| 8,650,564 B2* | 2/2014 | Huang et al. | 718/1 |
| 8,910,155 B1* | 12/2014 | Sobel | G06F 17/30 713/164 |
| 8,955,108 B2* | 2/2015 | Neystadt | G06F 21/53 726/22 |
| 2002/0073063 A1* | 6/2002 | Faraj | 707/1 |
| 2002/0091995 A1 | 7/2002 | Arnold et al. | |
| 2003/0192036 A1* | 10/2003 | Karkare et al. | 717/158 |
| 2004/0054992 A1* | 3/2004 | Nair et al. | 717/138 |
| 2004/0068560 A1* | 4/2004 | Oulu | G06F 11/3495 709/224 |
| 2004/0267691 A1 | 12/2004 | Vasudeva | |
| 2005/0114848 A1* | 5/2005 | Choi | G06F 9/45516 717/148 |
| 2006/0089984 A1 | 4/2006 | Chagoly et al. | |
| 2006/0236127 A1* | 10/2006 | Kurien | G06F 9/5077 713/193 |
| 2007/0180439 A1* | 8/2007 | Sundararajan et al. | 717/158 |
| 2007/0234302 A1* | 10/2007 | Suzuki et al. | 717/126 |
| 2007/0283009 A1* | 12/2007 | Takemura | H04L 43/08 709/224 |
| 2008/0126828 A1 | 5/2008 | Girouard et al. | |
| 2008/0243969 A1* | 10/2008 | Wintergerst | G06F 11/3466 |
| 2008/0243970 A1* | 10/2008 | Schmelter | G06F 11/3466 |
| 2008/0288212 A1* | 11/2008 | Greifeneder | G06F 11/3466 702/182 |
| 2009/0024994 A1 | 1/2009 | Kannan et al. | |
| 2009/0055693 A1* | 2/2009 | Budko et al. | 714/57 |
| 2009/0248611 A1* | 10/2009 | Xu et al. | 707/1 |
| 2010/0095280 A1* | 4/2010 | Schmelter et al. | 717/128 |
| 2010/0211958 A1* | 8/2010 | Madison, Jr. | G06F 11/3433 718/105 |
| 2010/0235836 A1* | 9/2010 | Bratanov | 718/1 |
| 2011/0004935 A1* | 1/2011 | Moffie et al. | 726/23 |
| 2011/0061050 A1* | 3/2011 | Sahita | G06F 9/45533 718/1 |
| 2011/0087927 A1* | 4/2011 | Arnold | G06F 11/366 714/38.1 |
| 2011/0107148 A1* | 5/2011 | Franklin | G06F 11/0712 714/37 |
| 2011/0296245 A1* | 12/2011 | Alberi | G06F 11/3664 714/38.1 |
| 2013/0091568 A1* | 4/2013 | Sharif | G06F 21/50 726/22 |

FOREIGN PATENT DOCUMENTS

| | | |
|---|---|---|
| TW | 200925995 A | 6/2009 |
| TW | 201027431 A | 7/2010 |

OTHER PUBLICATIONS

Gupta, Diwaker et al. "Xenmon: Qos monitoring and performance profiling tool." 2005. Hewlett-Packard Labs, Tech. Rep. HPL-2005-187.*

Wood, Timothy, et al. "Profiling and modeling resource usage of virtualized applications." 2008. Proceedings of the 9th ACM/IFIP/USENIX International Conference on Middleware. Springer-Verlag New York, Inc.*

"International Search Report", dated Sep. 10, 2012, Application No. PCT/US2011/065706, Filed Date: Dec. 19, 2011, pp. 1-8.

Xu, et al., "ReTrace: Collecting Execution Trace with Virtual Machine Deterministic Replay", Retrieved at << http://citeseerx.ist.psu.edu/viewdoc/download?doi=10.1.1.84.5732&rep=rep1&type=pdf >>, In Proceedings of the 3rd Annual Workshop on Modeling, Benchmarking and Simulation, MoBS, 2007, pp. 8.

"Monitoring IIS Performance in Windows Server 2003", Retrieved at << http://www.tech-faq.com/iis-performance-monitoring-and-tuning.html >>, Retrieved Date: Sep. 30, 2010, pp. 11.

"Office Action and Search Report Issued in Taiwan Patent Application No. 100141285", dated Oct. 12, 2015, 11 Pages.

"Office Action & Search Report Received for Chinese Patent Application No. 201110427924.6", dated Feb. 13, 2014, 11 Pages.

"Office Action received for Chinese Patent Application No. 201110427924.6", dated Jun. 5, 2014, 8 Pages.

"Second Office Action Issued in Chinese Patent Application No. 201110427924.6", dated Feb. 3, 2015, 6 Pages.

Payne, B. et al., "Lares: An Architecture for Secure Active Monitoring Using Virtualization," 2008 IEEE Symposium on Security and Privacy (SP 2008), May 18, 2008, Oakland, California, 16 Pages.

Taiwan Intellectual Property Office, Notice of Allowance Issued in Taiwan Patent Application No. 100141285, dated Mar. 30, 2016, 4 Pages.

European Patent Office, Extended European Search Report Issued in Patent Application No. 11849919.3, dated Apr. 6, 2016, 11 Pages.

"Office Action Issued in European Patent Application No. 11849919.3", dated Feb. 6, 2018, 6 Pages.

"Office Action Issued in Argentina Patent Application No. P110104820", dated Nov. 21, 2016, 7 Pages.

* cited by examiner

PROBE INSERTION VIA BACKGROUND VIRTUAL MACHINE

BACKGROUND

The complexity of distributed systems and their testing mechanisms have been widely explored for many years. There are many challenges inherent in distributed systems, such as latency of asynchronous communications, error recovery, clock drift, and service partitioning, leading to numerous problems including deadlocks, race conditions, and many other difficulties. Testing and monitoring of such complex systems presents big challenges. Over the years, many automatic test generation, deployment, and execution methods have been investigated and implemented. However, great efforts are still demanded in the area of monitoring and maintaining such systems.

It is very useful to be able to monitor the performance and behavior of servers in a datacenter or production setting. Most contemporary operating systems have event tracing or performance counter mechanisms for this purpose, but turning them on will usually incur some performance overhead—consuming CPU and disk/network IO to write their log files. If this has not been taken into account when capacity planning, this can cause the production servers to be overloaded resulting in failures and/or poor performance. Hence, tracing mechanisms are rarely used in production.

Many datacenters now use virtual machines to allow multiple production applications to run on a single server, each within a virtual environment so that each application thinks it has exclusive use of the machine. Instead, the application typically has exclusive use of the virtual machine. The virtual machine provides the application with a guaranteed amount of hardware resources, such as CPU speed, memory size, disk capacity, network bandwidth, and so forth. Hypervisors are widely available for commodity hardware that can allow multiple virtual machines to run side by side on the same computer (e.g., Xen, Hyper-V, and VMware). The hypervisor multiplexes (and sometimes schedules) access to the physical resources such as CPU, memory, disk, network. The hypervisor provides schedulers for both CPU and IO resources that are capable of providing a fixed partition of all resources between two or more VMs. This can be done in many ways, e.g. using hard-real time scheduling algorithms.

Monitoring performance within a virtual machine suffers the same challenges as monitoring within a physical machine. Turning on performance counters, logging, and other monitoring tools will consume some amount of the virtual machine's resources, and may potentially change the behavior of the application. For applications with high guaranteed uptime, the operator of the application cannot risk this kind of interference. In some cases, applications have solved this by turning monitoring on all the time, developing and testing the system under the assumption that the monitoring burden will constantly be there. While this can add predictability, the impact may still cause the application to run slower than expected and involves planning for and purchasing more hardware resources than would otherwise be used. Many applications are left choosing between constant monitoring with the accompanying slow application performance or no monitoring with the accompanying difficulty of diagnosing problems and monitoring behavior.

SUMMARY

A performance monitoring system is described herein that works with a hypervisor to reserve resources outside of a virtual machine to monitor performance of an application running within the virtual machine. The application receives the guaranteed amount of resources specified by the virtual machine's specifications, and the monitoring consumes resources not associated with the virtual machine, but potentially running on the same physical machine. The application running in the virtual machine is already isolated by the hypervisor from the physical machine, and thus additional burdens on the physical machine that allow the hypervisor to continue meeting guarantees to the virtual machine will not impact application performance. The performance monitoring system provides instrumentation of deployed applications that information technology (IT) personnel can dynamically turn on and off without affecting the performance of the deployed application. Furthermore, the system can provide additional probes or instrumentation points without having any measurable effect on application performance. Thus, the performance monitoring system provides a robust framework for monitoring production applications without affecting the performance of those applications during execution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A performance monitoring system is described herein that works with a hypervisor to reserve resources outside of a virtual machine to monitor performance of an application running within the virtual machine. The application receives the guaranteed amount of resources specified by the virtual machine's specifications, and the monitoring consumes resources not associated with the virtual machine, but potentially running on the same physical machine. The application running in the virtual machine is already isolated by the hypervisor from the physical machine, and thus additional burdens on the physical machine that allow the hypervisor to continue meeting guarantees to the virtual machine will not impact application performance. The performance monitoring system provides instrumentation of deployed applications that information technology (IT) personnel can dynamically turn on and off without affecting the performance of the deployed application. Furthermore, the system can provide additional probes or instrumentation points without having any measurable effect on application performance.

The performance monitoring system operates by reserving in advance some small fraction of the processing power, storage, and I/O capacity of each production server using virtualization technology. The production application runs in a virtual machine (VM) with a fixed amount of resources, and the instrumentation/logging/monitoring subsystem runs in a hidden/invisible VM or at the hypervisor level using the reserved capacity. The instrumentation VM can dynamically add/enable monitoring points in the production VM that allow the instrumentation VM to log information about the production VM without affecting the production VM's performance. In some embodiments, the hypervisor constrains the specifications of the instrumentation VM so that the hypervisor can guarantee a limited effect of the instrumentation VM on the physical machine. The instrumentation VM may run at a lower priority (e.g., background) than production VMs, to allow production VMs sufficient use of the physical machine. The deployed application may have no awareness of the existence of the instrumentation going on. The instrumentation VM can dynamically select a set of instrumentation by measuring the resources available to the instrumentation VM.

Alternatively or additionally, the hypervisor can run the instrumentation VM on a dedicated CPU (or hyper-thread) with a reserved region of physical memory and disk (perhaps even a dedicated additional storage device). Alternatively or additionally, the hypervisor can use hardware performance counters to vary the resources provided to the production system to maintain a consistent level of performance. In some embodiments, the performance monitoring system modifies an existing event tracing subsystem in the production VM (e.g., ETW in Windows) to log to a memory region (or other mechanism) shared between the two VMs. This allows the production VM to use normal performance monitoring tools, but to offload the resource impact to the instrumentation VM. Alternatively or additionally, the existing event tracing subsystem can be modified such that each instrumentation point includes an instruction that is transparently intercepted by the hypervisor (e.g., a specific instruction, or accessing a particular memory address that causes a 'VMEXIT'). The hypervisor then provides notification to any listening instrumentation VM. The hypervisor can selectively filter such notifications. Tools such as Strace (Solaris) and Dtrace (MSR-SVC) are used to add instrumentation to running kernels via binary rewriting. Similar techniques can be used in this system, with the ability to hide the rewritten code and instrumentation from the production VM using virtual address techniques. Thus, the performance monitoring system provides a robust framework for monitoring production applications without affecting the performance of those applications during execution.

Figure 1:
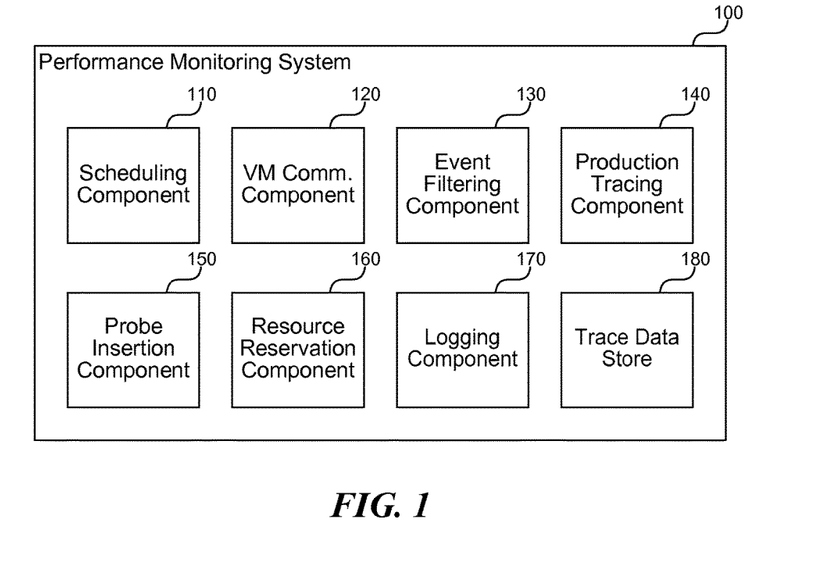
FIG. 1 is a block diagram that illustrates components of the performance monitoring system, in one embodiment.

FIG. 1 is a block diagram that illustrates components of the performance monitoring system, in one embodiment. The system 100 includes a scheduling component 110, a VM communication component 120, an event filtering component 130, a production tracing component 140, a probe insertion component 150, a resource reservation component 160, a logging component 170, and a trace data store 180. Each of these components is described in further detail herein.

The scheduling component 110, VM communication component 120, and event filtering component 130 may operate within a hypervisor that multiplexes access to physical resources shared between two or more virtual machines.

The scheduling component 110 provides scheduling of resource usage on a physical machine and resource isolation between two or more virtual machines, including a production virtual machine and an instrumentation virtual machine. The scheduling component 110 may operate within a hypervisor and provide virtual machine isolation so that each virtual machine can use physical machine resources in a way that meets any guarantees provided to each virtual machine for resource availability. For example, if a physical machine has a 2 GHz processor and each of two virtual machines has been guaranteed equivalent certain percent allocation of the CPU, then the scheduling component 110 may ensure that each virtual machine gets to use one-half or other amount of the physical machine's processor time. The scheduling component 110 can provide similar divisions of physical machine memory, disk space, network bandwidth, and other resources.

The VM communication component 120 provides one or more channels of communication between two or more virtual machines. A variety of techniques exists for cross-VM communication, including shared physical memory, hypercalls that call into the hypervisor, storing files at a common location on a physical disk, and so forth. The VM communication component 120 typically receives trace information coming out of a production VM and stores the trace information in a location accessible by an instrumentation VM. Storage is often cheap in terms of resources used compared to processing data, and the production VM can write trace data quickly and return to production work with negligible impact on the operation of the production VM, while the instrumentation VM processes the trace data separately. The hypervisor may manage the shared communication channel and enforce security or other restrictions on the instrumentation VM. The instrumentation VM may register with the hypervisor and provide credentials that satisfy the hypervisor that the instrumentation VM is authorized to intercept information coming from the production VM.

The event filtering component 130 filters event data before it reaches an instrumentation virtual machine. In some cases, some virtual machines may not have authorization to access some production machines, or the hypervisor may receive and pre-process event information for performance reasons. For example, a production VM may provide trace output all the time, but an instrumentation VM may not be listening and capturing the trace output. Thus, the hypervisor may receive the information first, determine if any instrumentation VM will receive the trace output and, if not, discard the trace output. In some embodiments, the instrumentation VM may set a level or category of trace output that it is interested in receiving and the event filtering component 130 may avoid sending non-matching trace information to the instrumentation VM. The instrumentation VM incurs a resource cost in processing trace information, so filtering what the instrumentation VM receives may increase performance.

The production tracing component 140 and probe insertion component 150 may operate within a production virtual machine, managed by the hypervisor, in which a target production application is running.

The production tracing component 140 operates within the production virtual machine to capture trace information and provide the trace information to the VM communication component. The production tracing component 140 may intercept calls or other usage of existing trace techniques, such as those provided by an operating system. For example, MICROSOFT™ WINDOWS™ provides an event log, performance counters, and other event tracing functionality that applications can use to provide trace information. The use of this functionality normally incurs some performance cost, but the performance monitoring system 100 offloads this cost by doing only a small amount of work to capture trace information within the production VM and offloading heavier processing of the trace information to the instrumentation VM. The production tracing component 140 is the front line component in the production VM that capture trace information. In some embodiments, the production tracing component 140 operates at the hypervisor level and intercepts calls to tracing application-programming interfaces (APIs) without the knowledge of the production VM or application running therein.

The probe insertion component 150 inserts one or more probes in the production virtual machine to intercept one or more activities related to events occurring within the production virtual machine. The probe insertion component 150 allows a problem investigator to place one or more specific probes into the production VM that capture information beyond what may be available through trace information. For example, the investigator may be interested in calls to a specific API, along with the parameters passed in and output results. The probe insertion component allows dynamic instrumentation of the production VM to intercept such calls and send probe information via the VM communication component 120 to the instrumentation VM.

The resource reservation component 160, logging component 170, and trace data store 180 may operate within an instrumentation virtual machine, managed by the hypervisor, in which instrumentation software code is running.

The resource reservation component 160 reserves resources for the instrumentation virtual machine to use for capturing trace information. Reserving resources ensures that the instrumentation VM operates with a predictable impact upon the physical machine's resources and allows the instrumentation VM to process trace and probe information without affecting performance of the production VM. The hypervisor and scheduling component 110 ensure that both the production VM and instrumentation VM share the use of the physical machine resources, isolated from one another's actual use of the physical machine. The resource reservation component 160 may simply operate as a normal VM specification to request an expected set of resource capabilities from the hypervisor, or may request dedicated resources, such as a dedicated processor, disk, or other resource. Processing trace information is often resource intensive and providing dedicated resources may allow more efficient processing while ensuring other tasks managed by the hypervisor are not impacted.

The logging component 170 stores trace information received and processed by the instrumentation virtual machine in the trace data store 180. The logging component 170 may store one or more files or other trace output that allows subsequent analysis of events that occurred within the production VM by a problem investigator, such as a tester, IT personnel, or a developer associated with the production application running in the production VM. The trace information may provide inputs, outputs, performance characteristics, operation times, and other information useful for diagnosing problems or ensuring correct operation of the application. In some embodiments, the logging component 170 provides periodic snapshots of an application that IT personnel or others can use as an example of application performance. For example, if the application receives web-based e-commerce orders, then the logging component 170 may capture one order in a thousand in detail so that a person can walk through the processing of the order and ensure correct behavior.

The trace data store 180 receives stored trace information and persists the information for subsequent manual or automated analysis. The trace data store 180 may include one or more in-memory data structures, files, file systems, hard drives, databases, storage area networks (SANs), cloud-based storage services, or other facilities for storing data. The trace data store 180 captures information stored by the logging component 170 and keeps the information for review and analysis by IT personnel or others interested in diagnosing and monitoring the production application.

The computing device on which the performance monitoring system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
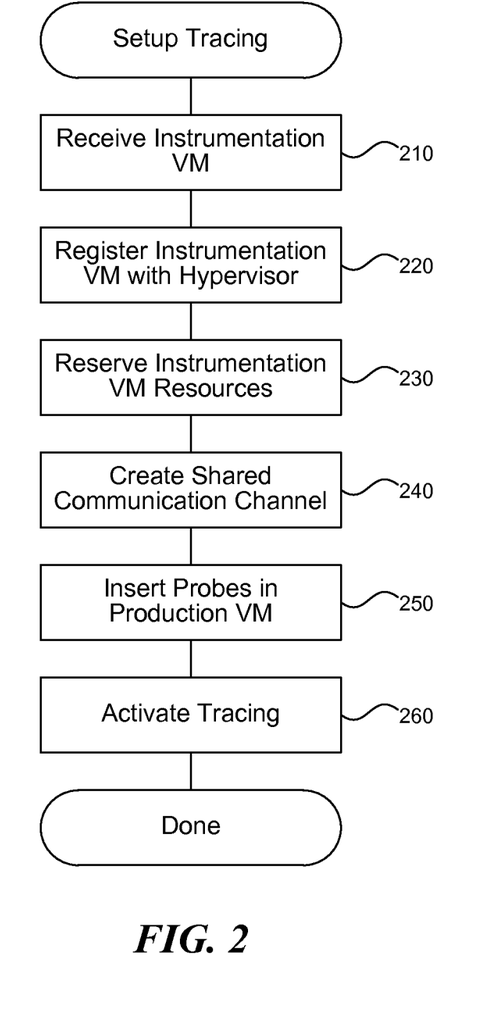
FIG. 2 is a flow diagram that illustrates processing of the performance monitoring system to setup tracing to an instrumentation virtual machine in a production virtual machine, in one embodiment.

FIG. 2 is a flow diagram that illustrates processing of the performance monitoring system to setup tracing to an instrumentation virtual machine in a production virtual machine, in one embodiment. Beginning in block 210, the system receives an instrumentation virtual machine that includes software instructions for monitoring a production virtual machine. The system may receive the instrumentation VM by a user installing the VM in a production environment or the hypervisor vendor may provide the instrumentation VM as part of an operating system for virtualization. The instrumentation VM may include one or more tools for setting itself up with the hypervisor, communicating with other VMs, and capturing trace data from the production VM for later analysis.

Continuing in block 220, the system registers the instrumentation virtual machine with a hypervisor so that the hypervisor can permit the instrumentation virtual machine to capture trace information from the production virtual machine. The hypervisor may enforce security authorization related to capturing trace data, and the instrumentation provides authentication information so that the hypervisor allows it to monitor activity within the production VM. It is the hypervisor's typical job to isolate VMs and the registration steps allows the instrumentation VM to access the production VMs activities.

Continuing in block 230, the system reserves one or more resources for the instrumentation virtual machine to use to capture and process trace information. For example, the system may reserve processor time, memory space, disk space, network bandwidth, or other resources for the instrumentation VM to use in a way that does not interfere with prior reservation requests of other VMs, including the production VM. The hypervisor may assign dedicated physical resources or partition shared resources through scheduling for the instrumentation VM to use. In this way, the resources used by the instrumentation are not known to the production VM and do not affect the production VMs ability to perform any normal production processing.

Continuing in block 240, the system creates a shared communication channel between the instrumentation virtual machine and the production virtual machine through which the instrumentation VM receives trace information from the production VM. The passage of trace information is an efficient operation that does not noticeably affect performance of the production VM, and the instrumentation VM can later process the trace information in a way that only affects the instrumentation VM. Thus, the system offloads the burden of processing trace information outside of the production application's execution environment.

Continuing in block 250, the system inserts one or more probes for capturing information related to specific activities within the production virtual machine. The probes cause the hypervisor to inform the instrumentation VM when particular conditions exist within the production VM. For example, a probe might inform the instrumentation VM when the application running in the production VM calls a particular API. The probes may also include overwriting normal tracing APIs in the production VM with hooks that reroute tracing information (or duplicate the information) to the instrumentation VM. Probes allow the instrumentation VM to monitor specific activities with little to no impact on the normal processing of the production VM.

Continuing in block 260, the system activates tracing to begin receiving trace information captured within the production virtual machine and communicated to the instrumentation virtual machine. Activation may include starting the production VM, starting the production application, starting the instrumentation VM, notifying the hypervisor that the instrumentation VM is ready to receive trace information, and/or other steps that prepare the system to receive trace information. After block 260, these steps conclude.

Figure 3:
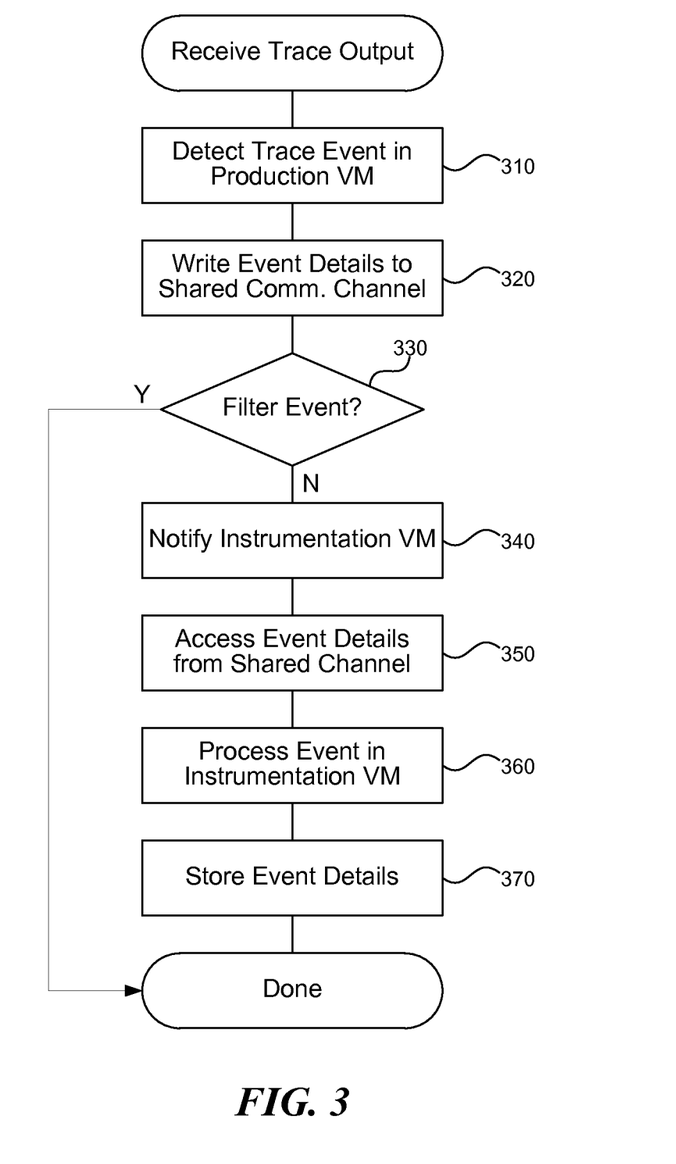
FIG. 3 is a flow diagram that illustrates processing of the performance monitoring system to receive trace output from a production virtual machine in an instrumentation virtual machine, in one embodiment.

FIG. 3 is a flow diagram that illustrates processing of the performance monitoring system to receive trace output from a production virtual machine in an instrumentation virtual machine, in one embodiment. Beginning in block 310, the system detects a trace event in the production virtual machine. For example, the system may detect a call to a tracing API within the production VM, detect a call to other APIs that reflect application activity, detect that a previously inserted probe instruction has been triggered, receive an external indication from the instrumentation VM to begin tracing, and so forth.

Continuing in block 320, the system writes event details about the detected trace event to a shared communication channel through which the instrumentation virtual machine can access information shared by the production virtual machine. For example, the system may create a shared memory buffer or use hypervisor VM sharing APIs to share information across VMs from the production VM to the instrumentation VM. Trace information captured from the production VM is processed by the instrumentation VM to reduce or eliminate the burden of trace processing from the production VM.

Continuing in decision block 330, the system determines whether the event should be filtered or provided to the instrumentation VM. If the event is to be filtered, then the system completes and waits for the next trace event, else the system continues at block 340 to notify the instrumentation VM. In some embodiments, the hypervisor captures trace data first and decides whether to pass the trace data on to one or more instrumentation decisions based on one or more trace criteria. The trace criteria may determine whether the instrumentation VM has sufficient authority to receive the trace information, whether the trace data is of a category or level requested by the instrumentation VM, whether the instrumentation VM is running and ready to receive trace data, or any other condition configured by a user of the system. The system may provide flexible configuration options for administrators or other users to setup the tracing based specific needs of the application being monitored.

Continuing in block 340, the system notifies the instrumentation virtual machine of the detected trace event. The system may notify the instrumentation VM directly, such as by providing a message, API call, or other notification to the instrumentation VM, or indirectly, such as by writing data to a file or shared memory region that the instrumentation VM monitors.

Continuing in block 350, the system accesses from the instrumentation virtual machine the event details from the shared communication channel written from the production virtual machine. In this way, data is communicated from the production VM to the instrumentation VM for processing using the instrumentation VM's resources. The production VM continues to execute without the burden of processing the trace information.

Continuing in block 360, the system processes, within the instrumentation virtual machine, the accessed event details. Processing may include determining whether an error occurred, analyzing historical trends in the data, deciding to insert a probe to capture additional data, or any other action taken by the instrumentation VM as a result of the received trace event. In some embodiments, a user may review the captured data and instruct the system to capture additional data and monitor additional types of information to get further details about a potential problem.

Continuing in block 370, the system optionally stores the processed event details in a trace data store. For example, the system may collect a historical journal of trace activity that is provided to one or more manual or automated tools for detecting anomalies in the trace data that suggest further investigation. The system may generate reports or alerts based on the stored event details to provide to one or more operators of the system that monitor behavior of the production application. For high availability applications, companies often employ dedicated operations centers to monitor the application and respond quickly to any errors. The performance monitoring system may provide information for such operation centers to monitor application behavior and receive notification when unexpected events occur. After block 370, these steps conclude.

In some embodiments, the performance monitoring system activates the instrumentation virtual machine as needed, based on requests. For example, the instrumentation VM may be installed on each computer system in a datacenter so that after a problem occurs an operator can activate the instrumentation VM and view trace output without disturbing the processing of the production VM. The operator can turn on the instrumentation VM and particular types of trace data capture, including requesting capture of any specific information through probes that can be placed in the running production VM. After the operator has enough details about the problem, the operator can turn off the capture of trace information and shut down or idle the instrumentation VM.

In some embodiments, the performance monitoring system uses a remote instrumentation VM to further reduce burdens on the production VM. For example, the system may perform the steps described herein to capture trace information from the production VM, but the hypervisor or other component may communicate captured trace information over a network or other communication channel to a remote physical or virtual machine running the trace processing logic normally contained in the instrumentation VM. This allows the processing of trace information to be further removed from the physical machine on which the production VM is running.

In some embodiments, the performance monitoring system installs a driver or other component into the production VM that assists the instrumentation VM in capturing trace information with little impact to the production VM. Many virtualization tools suites provide driver packages that can be installed in virtual machines to make the virtual machines operate more efficiently on the physical hardware hosting the virtual machines. For example, the drivers may forward graphics calls to graphics hardware for faster processing rather than emulating virtual graphics hardware on physical hardware. Similar techniques can be used to capture trace calls within the production VM's operating system and forward this information to the hypervisor or directly to the instrumentation VM.

From the foregoing, it will be appreciated that specific embodiments of the performance monitoring system have been described herein for purposes of illustration, but that various modifications may be made without deviating from the spirit and scope of the invention. Accordingly, the invention is not limited except as by the appended claims.

We claim:

1. A computer-implemented method for setting up tracing from a production virtual machine to an instrumentation virtual machine, the method comprising:
    registering an uninstantiated instrumentation virtual machine having credential information with a hypervisor, in order to receive trace information;
    based on the registration, setting up access permissions at the hypervisor that provide authorization for the uninstantiated instrumentation virtual machine to receive the trace information;
    creating, by a virtual machine (VM) communication component of the hypervisor, a shared communication channel that communicates the trace information from the production virtual machine to a future instantiated instrumentation virtual machine, wherein the shared communication channel is managed by the hypervisor;
    subsequent to the registration, inserting, by the production virtual machine, one or more probes within the production virtual machine by overwriting tracing application programming interfaces (APIs) of a production application with one or more hooks that re-route the trace information from the production virtual machine to the hypervisor;
    activating tracing to begin receiving the trace information captured within the production virtual machine,
    wherein activating tracing comprises: starting the instrumentation virtual machine on the hypervisor, and authenticating the instrumentation virtual machine, based on the access permissions, with the hypervisor to enable monitoring of the production virtual machine;
    notifying the hypervisor that the instrumentation virtual machine is ready to monitor execution of the production application and to receive the trace information;
    capturing, by a production tracing component of the production virtual machine, the trace information, based on the tracing APIs corresponding to the inserted one or more probes;
    responsive to capturing the trace information and not being authenticated, discarding the trace information; and
    responsive to capturing the trace information and being authenticated, using the shared communication channel, by the hypervisor, to:
        re-route the trace information from the production virtual machine to the instrumentation virtual machine through the hypervisor, wherein the re-routed trace information is stored in a trace data store of the instrumentation virtual machine, for later analysis.

2. The method of claim 1, wherein receiving the instrumentation virtual machine comprises detecting a user installing the instrumentation virtual machine in a production environment.

3. The method of claim 1, wherein receiving the instrumentation virtual machine comprises identifying an instrumentation virtual machine provided as part of an operating system for virtualization.

4. The method of claim 1, wherein the instrumentation virtual machine runs at the hypervisor level.

5. The method of claim 1, wherein creating the shared communication channel comprises creating a channel that allows the production virtual machine to share information efficiently in a way that does not noticeably affect performance of the production virtual machine.

6. The method of claim 1, wherein creating the shared communication channel allows the production virtual machine to offload processing of the trace information to the instrumentation virtual machine outside of the production environment.

7. The method of claim 1, wherein inserting one or more probes comprises causing the hypervisor to inform the instrumentation virtual machine if particular conditions exist within the production virtual machine.

8. The method of claim 1, wherein a reservation of one or more resources for the instrumentation virtual machine assigns dedicated physical resources to the instrumentation virtual machine such that only performance of the instrumentation virtual machine is affected by the assignment of dedicated physical resources.

9. A computer system for monitoring application performance in a production virtual machine via a background instrumentation virtual machine, the system comprising:
    a processor and memory configured to execute software instructions embodied within components, the software instructions causing the processor and memory to instantiate the following components;
    a scheduling component that provides scheduling of resource usage on a physical machine and resource isolation between two or more virtual machines, including a production virtual machine currently executing and an instrumentation virtual machine to be instantiated in the future;
    the instrumentation virtual machine that registers credential information with a hypervisor, in order to receive trace information;
    the hypervisor that sets up access permissions, based on the registration, the access permissions providing authorization for the uninstantiated instrumentation virtual machine to receive the trace information;

a virtual machine communication component that creates a shared communication channel that communicates the trace information from the production virtual machine to a future instantiated instrumentation virtual machine, wherein the shared communication channel is managed by the hypervisor, and wherein the virtual machine (VM) communication component is part of the hypervisor;

a probe insertion component that inserts one or more probes within the production virtual machine, subsequent to the registration, by overwriting tracing application programming interfaces (APIs) of a production application with one or more hooks that re-route the trace information from the production virtual machine to the hypervisor;

a production tracing component that operates within the production virtual machine to capture trace information and provide the trace information to the virtual machine communication component during the concurrent operation, wherein tracing is activated to begin receiving the trace information captured within the production virtual machine, wherein the activated tracing comprises:

starting the instrumentation virtual machine on the hypervisor, and authenticating the instrumentation virtual machine, based on the access permissions, with the hypervisor to enable monitoring of the production virtual machine; and wherein the hypervisor is notified that the instrumentation virtual machine is ready to monitor execution of the production application and to receive the trace information;

the production tracing component further performing steps of:

capturing the trace information, based on the tracing APIs corresponding to the inserted one or more probes;

responsive to capturing the trace information and not being authenticated discarding the trace information; and responsive to capturing the trace information and being authenticated, using the shared communication channel, by the hypervisor, to:

re-route the trace information from the production virtual machine to the instrumentation virtual machine through the hypervisor;

a logging component that stores the re-routed trace information received and processed by the instrumentation virtual machine, for later analysis; and a trace data store that receives the trace information.

10. The system of claim 9, wherein the scheduling component operates within the hypervisor and provides virtual machine isolation so that each virtual machine can use physical machine resources in a way that meets any guarantees provided to each virtual machine for resource availability.

11. The system of claim 9, wherein the virtual machine communication component provides a shared memory region accessible to both the instrumentation virtual machine and the production virtual machine.

12. The system of claim 9, wherein the virtual machine communication component receives one or more hypervisor application programming interface calls (hypercalls) that use the hypervisor to share information between the instrumentation virtual machine and the production virtual machine.

13. The system of claim 9, wherein the virtual machine communication component enforces security restrictions through the hypervisor that determine which virtual machines can access information communicated from the production virtual machine.

14. The system of claim 9, further comprising an event filtering component that filters event data before it reaches the instrumentation virtual machine based on one or more filtering criteria.

15. The system of claim 9, wherein a resource reservation component ensures that the instrumentation virtual machine operates with a predictable impact upon a physical machine's resources and allows the instrumentation virtual machine to process trace and probe information without affecting performance of the production virtual machine.

* * * * *